(12) United States Patent
Regier (10) Patent No.: US 10,405,494 B2
(45) Date of Patent: Sep. 10, 2019

(54) THRESHING APPARATUS IN A COMBINE HARVESTER HAVING A MULTIPOSITION STOP DEVICE FOR SETTING CLEARANCE OF CONCAVE GRATE SEGMENT

(71) Applicant: AGCO Corporation, Duluth, GA (US)

(72) Inventor: Bernard D. Regier, Hesston, KS (US)

(73) Assignee: AGCO Corporation, Duluth, GA (US)

( * ) Notice: Subject to any disclaimer, the term of this patent is extended or adjusted under 35 U.S.C. 154(b) by 134 days.

(21) Appl. No.: 15/713,942

(22) Filed: Sep. 25, 2017

(65) Prior Publication Data

US 2018/0084728 A1 Mar. 29, 2018

Related U.S. Application Data

(60) Provisional application No. 62/399,834, filed on Sep. 26, 2016.

(51) Int. Cl.
*A01F 12/28* (2006.01)
*A01F 7/06* (2006.01)
*A01F 12/20* (2006.01)
*A01F 12/26* (2006.01)

(52) U.S. Cl.
CPC ........... *A01F 12/28* (2013.01); *A01F 7/06* (2013.01); *A01F 12/20* (2013.01); *A01F 12/26* (2013.01)

(58) Field of Classification Search
CPC .. A01F 12/28; A01F 7/06; A01F 12/20; A01F 12/26; A01F 12/24; A01F 12/181; A01F 12/185; A01F 7/062
See application file for complete search history.

(56) References Cited

U.S. PATENT DOCUMENTS

| 2,616,433 | A | * | 11/1952 | Anderson | A01F 12/28 |
| | | | | | 241/88.4 |
| 3,568,682 | A | * | 3/1971 | Knapp | A01F 12/24 |
| | | | | | 460/108 |
| 3,631,862 | A | * | 1/1972 | Rowland-Hill | A01F 12/28 |
| | | | | | 460/109 |
| 4,262,679 | A | * | 4/1981 | James | A01F 12/16 |
| | | | | | 460/106 |
| 4,993,991 | A | * | 2/1991 | Yarmashev | A01F 7/06 |
| | | | | | 460/66 |

(Continued)

FOREIGN PATENT DOCUMENTS

| DE | 10045795 A1 | * | 4/2002 | ............. A01F 12/24 |
| EP | 0071579 A2 | * | 2/1983 | ............. A01F 12/28 |

(Continued)

OTHER PUBLICATIONS

UK Intellectual Property Office, International Search Report for related UK Application No. GB1702774.9 dated Aug. 11, 2017.

*Primary Examiner* — Arpad Fabian-Kovacs (57) ABSTRACT

A threshing apparatus in a combine harvester has a main frame and a threshing rotor supported by the main frame. A concave frame supports one or more interchangeable arcuate concave grate segments in a grate reception zone. An adjustment mechanism provides adjustment of clearance between the concave grate segments and the rotor. A multi-position stop device is provided to determine the lower limit of a concave adjustment range. The position of the stop device is determined by a profile of an installed one of the interchangeable concave grate segments.

20 Claims, 7 Drawing Sheets

(56) References Cited

U.S. PATENT DOCUMENTS

| | | | |
|---|---|---|---|
| 5,489,239 A | 2/1996 | Matousek et al. | |
| 6,485,364 B1* | 11/2002 | Gryspeerdt | A01D 41/1271 460/107 |
| 7,166,026 B2* | 1/2007 | Ricketts | A01F 12/26 460/108 |
| 7,393,274 B2* | 7/2008 | Voss | A01F 12/28 460/109 |
| 9,149,001 B2* | 10/2015 | Holtmann | A01F 12/28 |
| 2002/0077162 A1* | 6/2002 | Imel | A01F 12/26 460/109 |
| 2005/0009591 A1* | 1/2005 | Duquesne | A01F 12/28 460/107 |
| 2005/0215299 A1 | 9/2005 | Puryk et al. | |
| 2011/0151950 A1* | 6/2011 | Regier | A01F 12/181 460/69 |
| 2011/0151951 A1* | 6/2011 | Regier | A01F 12/181 460/109 |
| 2013/0137492 A1* | 5/2013 | Biggerstaff | A01F 12/28 460/62 |
| 2014/0308998 A1* | 10/2014 | Bergkamp | A01F 12/28 460/107 |
| 2016/0316631 A1* | 11/2016 | Davenport, III | A01F 12/26 |
| 2016/0345499 A1* | 12/2016 | Van Hullebusch | A01F 7/06 |
| 2017/0105351 A1* | 4/2017 | Matway | A01F 12/185 |
| 2017/0164559 A1* | 6/2017 | Matousek | A01F 7/062 |
| 2017/0339832 A1* | 11/2017 | Matousek | A01F 12/26 |
| 2018/0132421 A1* | 5/2018 | Ohms | A01F 12/446 |

FOREIGN PATENT DOCUMENTS

| | | |
|---|---|---|
| EP | 3097767 A1 | 11/2016 |
| WO | 2001/24609 A1 | 4/2001 |
| WO | 2011/073752 A1 | 6/2011 |

* cited by examiner

FIG. 12 ately parallel to the rotational axis of one or more

THRESHING APPARATUS IN A COMBINE HARVESTER HAVING A MULTIPOSITION STOP DEVICE FOR SETTING CLEARANCE OF CONCAVE GRATE SEGMENT

BACKGROUND OF THE INVENTION

Field of the Invention

The invention relates to a concave adjustment mechanism in threshing apparatus of a combine harvester, and in particular to threshing apparatus that can accept different concave grate segments for harvesting different crops.

Description of Related Art

Agricultural combines are large machines that harvest, thresh, separate and clean an agricultural crop. The resulting clean grain is stored in a grain tank located on the combine. The clean grain can then be transported from the grain tank to a truck, grain cart or other receiving bin by an unloading auger. In a rotary processing system the crop travels axially parallel to and helically around the rotational axis of one or more rotary processing devices commonly referred to as rotors. In conventional, or tangential-flow, systems, during at least a portion of its travel through the system the crop travels in a transverse or tangential direction relative to the rotational axis of a rotary processing device. In each case, grain is processed between elements affixed to the periphery of the rotary device and arcuate, usually foraminous, stationary processing members in the form of threshing concaves or separating grates that partially wrap around the lower portion of the device.

The radial clearance between the threshing elements and the grates is typically adjustable to cater for the harvesting of different crops. Moreover, it is well known to provide interchangeable sets of grate segments which are suited to different crops, the grate segments being supported by a concave frame which is adjustable with respect to the rotor.

For example, a concave grate suited for small grains may include a fine matrix of square bar elements, whereas a concave grate more suited for corn may include a wider matrix of rounded bar elements. Different crops often require different concave clearances. By way of example, corn is typically harvested with a greater concave clearance than when harvesting wheat. The interchangeable grate segments are thus typically manufactured with an optimum radius so as to be concentric with the rotor at their typical operating setting. As a result a corn concave grate segment typically has a larger radius than a small grain concave segment.

When the concave segments are installed in the concave frame, the radial clearance must be adjusted accordingly to suit the harvesting conditions faced. When the larger radius corn concave segments are fitted to the concave frame however, special care must be exercised to ensure that the clearance adjustment is kept at a setting which is sufficient to avoid the grate segment interfering with the swept envelope of the rotor and causing damage.

SUMMARY OF THE INVENTION

In accordance with one aspect of the invention there is provided threshing apparatus in a combine harvester, the threshing apparatus comprising:
a main frame,
a threshing rotor supported by the main frame and being operable to rotate and define a substantially cylindrical swept envelope when in rotation,
a concave frame adapted to support one or more arcuate concave grate segments in a grate reception zone defined by the concave frame, the concave frame being mounted to the main frame so as to enable adjustment of a radial clearance with respect to the swept envelope,
an adjustment linkage coupled to the concave frame for adjusting said radial clearance within an adjustment range, and,
a stop device secured to the concave frame,
wherein the stop device comprises a multi-position stop element that is shiftable between a plurality of alternative positions which determine a lower limit of the adjustment range, and,
when in one of said alternative positions a portion of the stop element resides inside the grate reception zone.

The stop element, in one or more positions, serves to limit the adjustment range of the concave frame by contacting a part of the main frame for example. The position of the stop element can be influenced by the design of a concave grate segment installed in the grate reception zone. For example, in one embodiment, the installed concave grate segment has a profile which forces the stop element outside of the grate reception zone and, as a result, increases the lower limit of the adjustment range. In another embodiment, the installed concave grate segment has a profile which permits the stop element to reside inside the grate reception zone.

The concave frame preferably surrounds an outside edge of the grate reception zone and comprises first and second axial frame members which extend generally parallel to the rotation axis of the threshing rotor, and a pair of generally arcuate, axially-spaced, members which connect the first and second members. The stop device may be secured to the first axial frame member of the concave frame.

In one embodiment the the stop element comprises a cam rotatably supported on first axial frame member, wherein the cam passes through a slot provided in the first axial frame member into the grate reception zone when in said one of said alternative positions. In a preferred arrangement the stop device may further comprise a pair of lugs secured to the first axial frame member and located either side of the slot, wherein the cam is rotatably supported between the lugs.

The cam may comprise first and second sectors wherein the first sector has a radial dimension that is greater than that of the second sector, wherein the said plurality of alternative positions includes a first position in which the first sector resides inside the grate reception zone, and a second position in which the first sector resides completely outside of the grate reception zone, and wherein the cam permits a smaller radial clearance when in the first position than when in the second position.

The invention is applicable to both rotary processing systems and conventional processing systems.

These and other features and advantages of this invention are described in, or are apparent from, the following detailed description of various exemplary embodiments of the apparatus and systems according to the invention.

BRIEF DESCRIPTION OF THE DRAWINGS

The above mentioned and other features of this invention will become apparent and the invention itself will be better understood by reference to the following description of embodiments of the invention taken in conjunction with the accompanying drawings, wherein.

Corresponding reference characters indicate corresponding parts throughout the views of the drawings.

DETAILED DESCRIPTION OF EXEMPLARY EMBODIMENTS

The invention will now be described in the following detailed description with reference to the drawings, wherein preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description.

Figure 1:
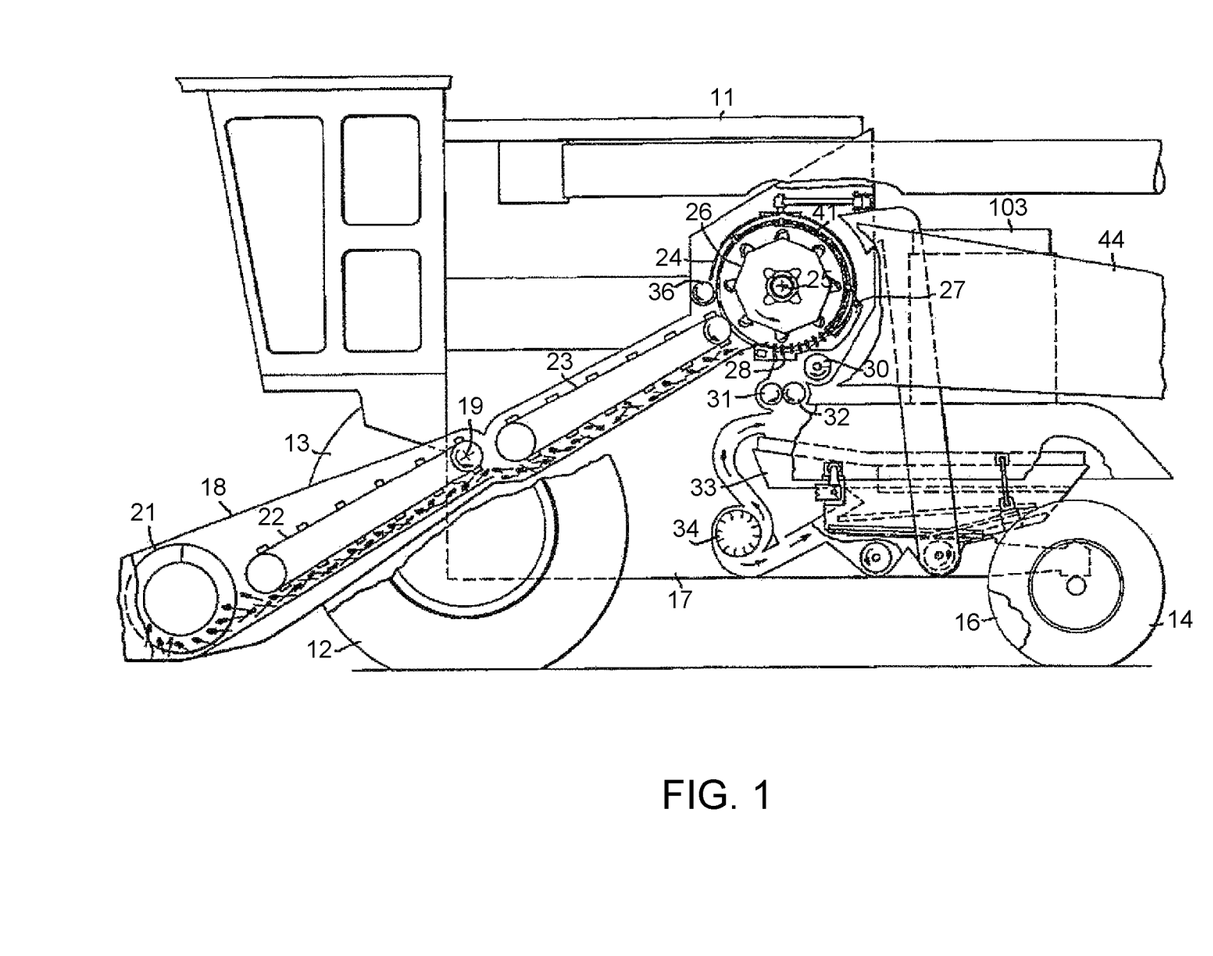
FIG. 1 is a schematic side elevational view of a combine harvester having rotary threshing apparatus and suitable for incorporating aspects of the invention, portions of the harvester being broken away to reveal internal detail of the construction.

Referring to FIG. 1, a combine 11 includes a pair of front drive wheels 12, 13 and a pair of steerable rear wheels 14, 16 supporting a main frame 17. A header 18 is pivotally connected to the main frame 17 on a transverse axis 19 for vertical adjustment of the cutting height. An auger 21 with oppositely pitched flights moves the cut grain inwardly from the transversely outward extending ends of the header to a central location where a first slat feeder 22 moves the cut stalks upwardly and rearwardly to a second slat feeder 23. The second slat feeder 23 in turn moves the cut stalks to an opening in a rotor housing 24 in which a threshing rotor 26 is disposed.

The threshing rotor 26 forms part of a transverse, rotary, crop processor which conveys the stream of cut stalks in a generally spiral path around the rotor 26 and inside the housing 24, the path transporting the crop stream in a generally transverse direction, for example from left to right. It should be understood that the transverse processor illustrated is by way of example only, and that aspects of the invention can be applied just as well to other types of threshing apparatus including conventional 'tangential-flow', axial-flow rotary, and hybrid crop processors.

Turning back to FIG. 1 the threshing rotor 26 is mounted on the side walls of the main frame 17 for rotation about a transverse axis 25. The rotor housing 24, which is essentially a cylindrical screen or sieve, includes a concave frame 28 pivoted on a transverse axis 27. Pivoting of the concave frame 27 serves to adjust a radial clearance between concave grate segments supported on the frame and a cylindrical swept envelope of the threshing rotor 26.

The concave frame 28 is adapted to support a plurality of side-by-side concave grate segments which will be described in more detail below. The grate segments are interchangeable with other of a different design so as to better suit different crops.

Threshed material passing through the peripheral openings of the rotor housing 24 or downwardly through the concave 28, is guided by distribution augers 29, 30 and an overfeed auger 36 to a pair of accelerator rolls 31, 32 which accelerate threshed material downwardly toward a grain pan 33 through a layer of horizontally directed air supplied by a blower 34. The straw which stays within the cage 24 is moved axially by helical ribs 41 on the inside of the cage to a discharge beater 42 on the cylinder 26 adjacent a discharge opening 43 at the rear side of one axial end of the cage. The beater 42 discharges the straw from the cage and an additional rearwardly positioned discharge beater (not shown) induces movement of the straw rearwardly through a straw discharge chute 44.

The combine 11 illustrated in FIG. 1 is suitable for incorporating aspects of the invention because it comprises threshing apparatus having a concave with adjustable clearance and interchangeable concave grate segments. The threshing apparatus described hereinafter is not identical to that of the combine 11 described above, but does share the same operating principals and comprises similar functionality.

Figure 2:
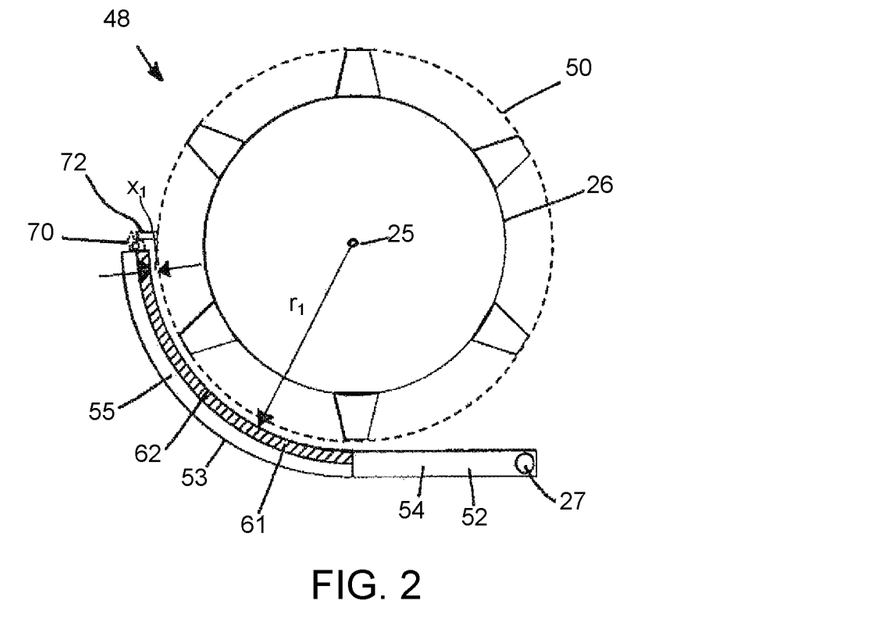
FIG. 2 is a schematic sectional view through threshing apparatus in accordance with a first embodiment of the invention, shown with a small grain concave grate segment installed.

With reference to FIG. 2, threshing apparatus 48 in accordance with a first embodiment of the invention comprises a threshing rotor 26 which is operable to rotate on a rotation axis 25 and define a substantially cylindrical swept envelope 50 when in rotation. A concave frame 52 comprises an arcuate portion 53 and a straight portion 54, the arcuate portion 53 being adapted to support a set of concave grate segments in a grate reception zone 55.

The concave frame 52 is pivotally mounted to a main vehicle frame for movement around a pivot axis 27 which is parallel to the rotor axis 25. The pivoting movement of the concave frame 52 enables adjustment of a radial clearance '$x_1$' between the swept envelope 50 and the supported grate segments. An adjustment linkage (not shown in FIG. 2) is coupled to the concave frame for adjusting the radial clearance $x_1$ within an adjustment range. The clearance x may be adjusted manually by the operator or automatically by an electronic control system.

As explained above, the concave clearance $x_1$ is adjustable to cater for harvesting different crops. For example, the threshing of small grains requires a smaller clearance than for threshing corn. Moreover, in order to reduce grain damage whilst maintaining effective threshing capacity, the concave segments can be designed to be more or less aggressive to suit the various crops. For example, corn is more susceptible to damage and so a concave with a less aggressive threshing surface is often employed. To meet the requirements of different crops the concave grate segments can be interchanged.

FIG. 2 shows a generally arcuate concave segment 61 installed on the concave frame 52, the concave segment 61 being designed specifically for threshing small grain (hereinafter referred to as a small grain concave). As such, the radius '$r_1$' of the small grain concave 61 is chosen so that the threshing surface 62 is concentric with the rotor 26 at the optimum clearance $x_1$ represented in FIG. 2. Although the clearance x remains adjustable, the threshing surface 62 remains substantially concentric around the optimum clearance for small grains.

The arcuate portion 53 of the concave frame 52 defines the grate reception zone 55 in which the small grain concave 61 is shown as installed in FIG. 2. Described in more detail below, a portion of a stop element 70 is permitted to remain inside the grate reception zone 55 when the small grain concave is installed. The lower extent of the adjustment range of the concave clearance is determined by the stop element 70 contacting or abutting a frame member 72 which is fixed in relation to the rotor housing 24 or main frame 17.

Figure 3:
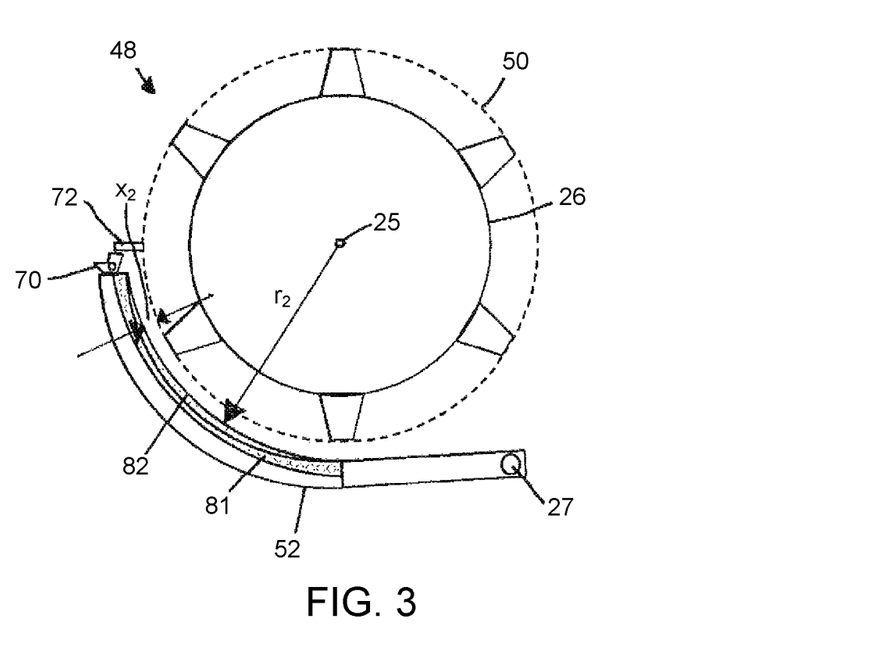
FIG. 3 is a schematic sectional view through the threshing apparatus of FIG. 2, shown with a corn concave grate segment installed.

FIG. 3 shows the same threshing apparatus 48 as in FIG. 2, but shown instead with a corn concave grate segment 81 (hereinafter referred to as a corn concave) installed in place of the small grain concave 61. The corn concave 81 is designed with a greater radius $r_2$ so as provide a concentric threshing surface 82 when at the optimum concave clearance $x_2$ represented in FIG. 3.

The corn concave 81 is designed so as to force the stop element 70 outside of the grate reception zone 55 when installed. This causes the stop element 70 to rotate and contact the frame member 72 at a greater concave clearance spacing. As such the lower extent of the concave adjustment range is increased. Advantageously, this prevents the larger radius corn concave interfering with the swept envelope 50 and causing damage thereto.

Figure 4:
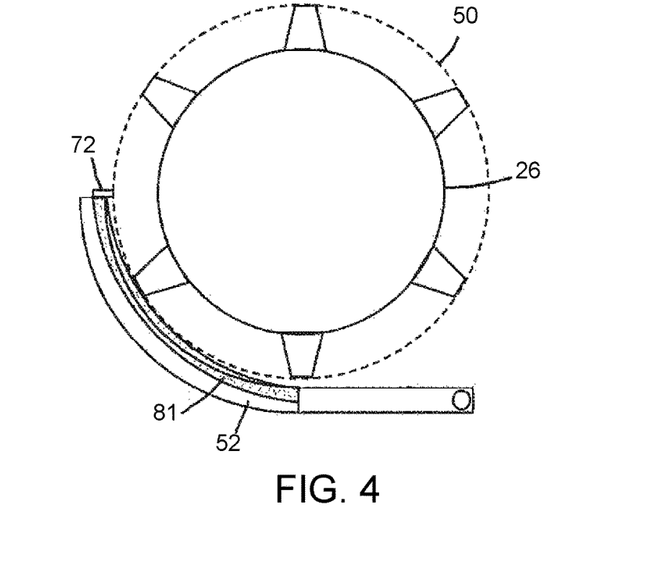
FIG. 4 is a schematic sectional view through threshing apparatus not fitted with a stop element and shown with a corn concave grate segment installed which is interfering with the rotor.

An equivalent threshing arrangement without the stop element fitted is shown in FIG. 4 in which the corn concave 81 is shown to interfere with the swept envelope 50 at small concave clearance settings. This illustrates the risk of damage avoided by the described aspects of the invention.

FIGS. 5-12 illustrate a second embodiment of the invention in more detail. However, it should be appreciated that the threshing apparatus described operates in much the same way as that described above.

Figure 5:
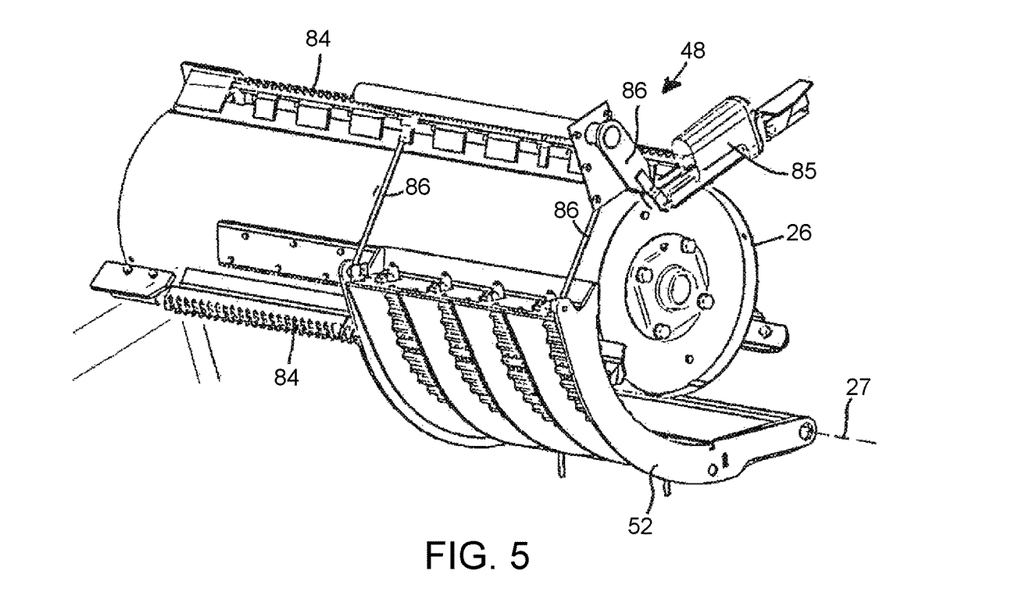
FIG. 5 is a perspective view of threshing apparatus in accordance with a second embodiment of the invention.

With reference to FIG. 5, threshing apparatus 48 comprises a main frame 17 and a threshing rotor 26 supported for rotation. Threshing elements in the form or rasp bars 84 are secured to the outside of the rotor 26.

A concave frame 52 is pivotally mounted to the frame 17 around a pivot axis 27. A concave adjustment system comprises a linear actuator 85 mounted to the main frame 17. The linear actuator 85 is coupled to the concave frame 52 by an adjustment linkage 86, together being operable to adjust the radial clearance of the concave within an adjustment range by pivoting the concave frame 52 around the pivot axis 27. The concave adjustment system is known in the art and alternative arrangements to that illustrated will be within the realms of normal workshop practice.

Figure 6:
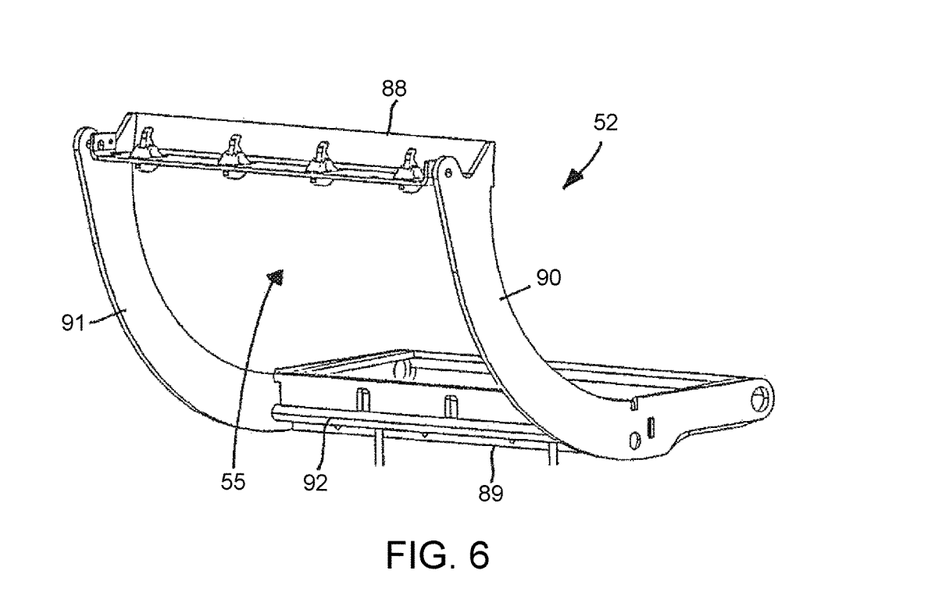
FIG. 6 is a perspective view of a concave frame which forms part of the threshing apparatus of FIG. 5.

Turning to FIG. 6, the concave frame in the illustrated embodiment surrounds an outside edge of the grate reception zone 55 and comprises first and second axial frame members 88, 89 which extend generally parallel to the rotation axis 25 of the threshing rotor 26, and a pair of generally arcuate, axially-spaced, members 90, 91 which connect the first and second members 88, 89. The second axial frame member 89 comprises a rounded cross section portion 92 which provides an attachment ledge to which the concave segments can attach. The grate reception zone 55 surrounded by the inside edges of members 88,89,90,91 is generally arcuate in shape.

Figure 7:
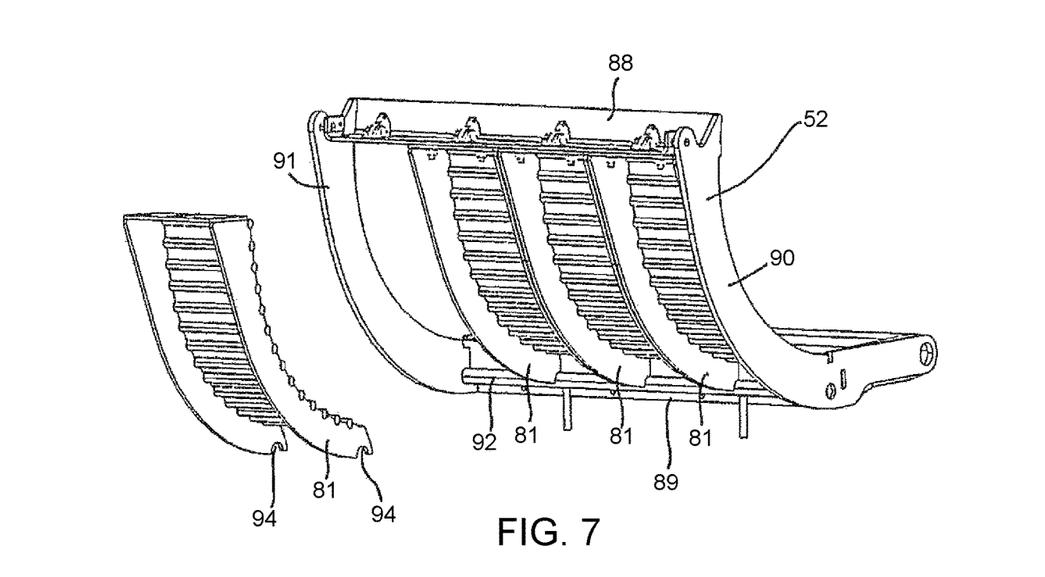
FIG. 7 is a perspective view of the concave frame of FIG. 6 shown with a set of corn concave grate segments installed.

As alluded to above, interchangeable sets of concave grate segments are selectably fitted to the concave frame 52. For example, FIG. 7 shows a set of four corn concave grate segments 81, wherein three are shown fitted to the concave frame 52 and one is shown spaced therefrom for sake of illustration. Both the corn concave grate segments 81 (FIGS. 7 and 11) and the small grain concave segments 61 (FIGS. 8 and 12) are generally arcuate in shape, comprise rounded cutouts 94 to engage the rounded ledge 92, and bolt holes 95 for securing to the first axial frame member 88 by bolts 96. The sets of concave grate segments 61, 81 are typically interchanged by the operator and accessed through side panels in the main frame 17.

Figure 8:
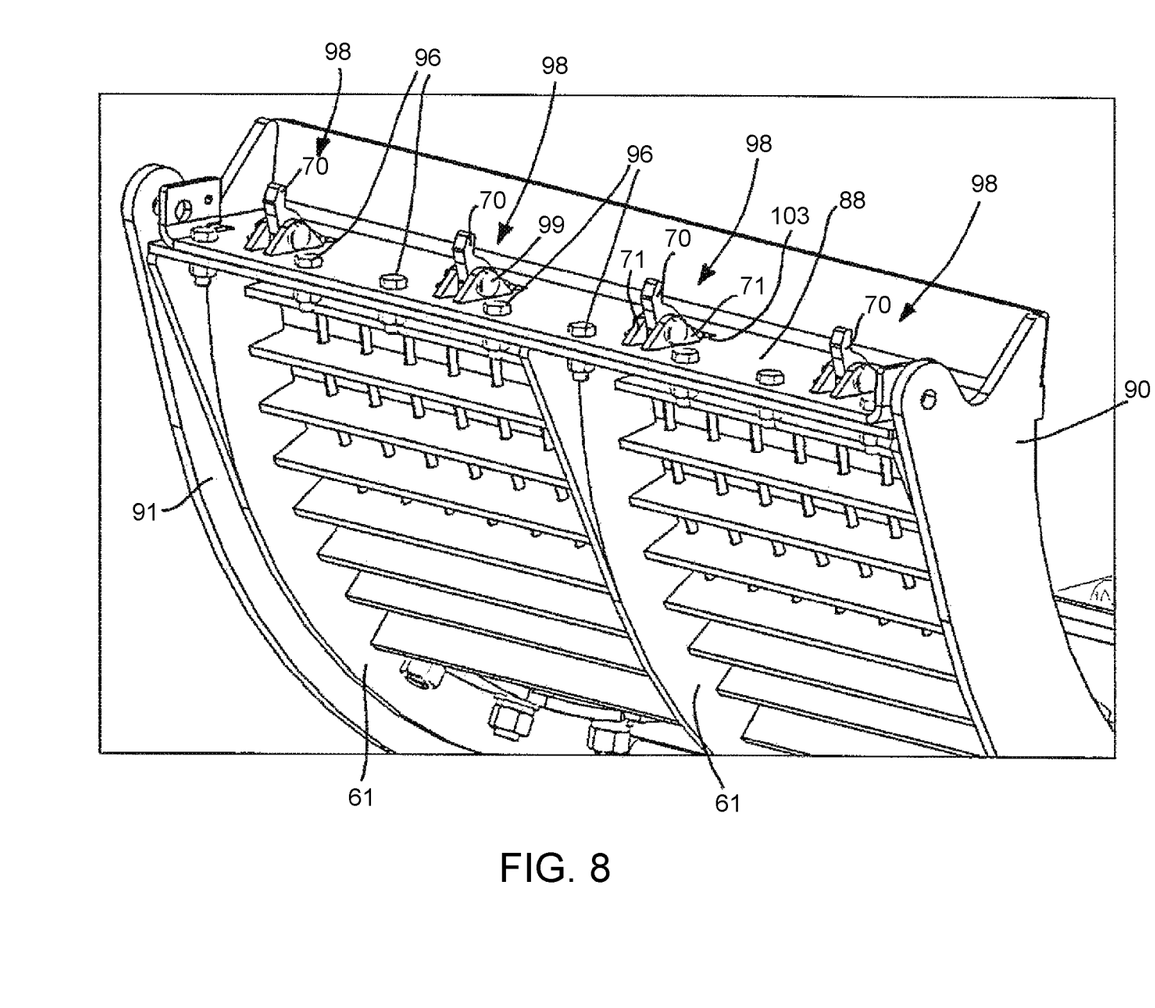
FIG. 8 is a perspective view of the concave frame of FIG. 6 shown with a set of small grain concave grate segments installed.
Figure 9:
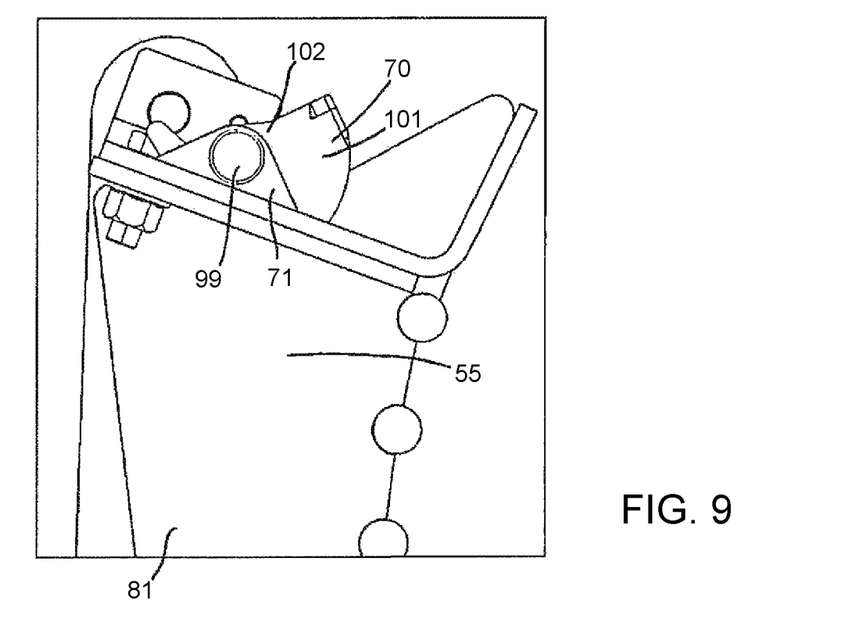
FIG. 9 is an enlarged sectional view through the concave frame and one corn concave grate segment of FIG. 7.
Figure 10:
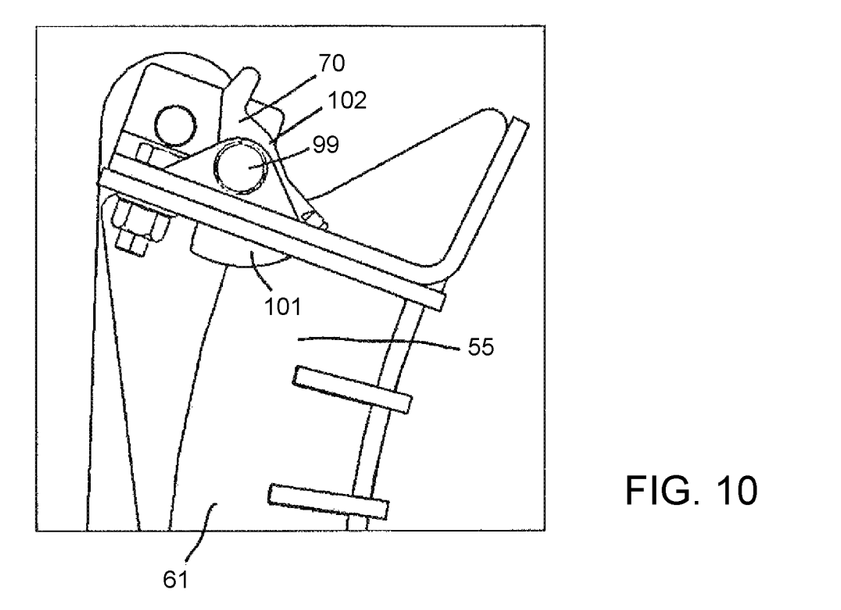
FIG. 10 is an enlarged sectional view through the concave frame and one small grain concave grate segment of FIG. 8.
Figure 11:
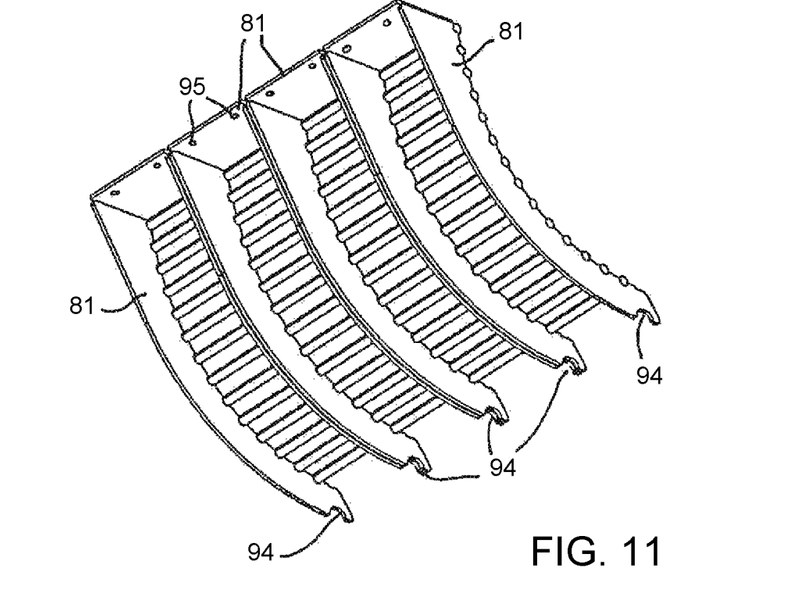
FIG. 11 is a perspective underside view of the set of corn concave grate segments of FIG. 7 shown in isolation; and, FIG. 12 is a perspective underside view of the set of small grain concave grate segments of FIG. 8 shown in isolation.

With reference to FIGS. 8-10, four stop devices 98 are secured to the axial frame member 88, each comprising a stop element in the form of a cam 70 rotatably supported between two upstanding lugs 71. Each stop device 98 comprises a bolt or a pin 99 to secure the cam 70 between the lugs 71. It should be understood that more or less than four stop devices 98 may be employed.

Each cam 70 serves to abut or contact a frame member 72 to prevent continued travel of the concave frame 52 and effectively set the lower limit (minimum achievable clearance) of the concave adjustment range. The cams 70 are shaped so as to change the lower limit depending on their position.

Best shown in FIGS. 9 and 10, each cam 70 comprises a first sector 101 and a second sector 102. The first sector 101 has a radial dimension (with respect to the axis of pin 99) that is greater than the radial dimension of the second sector 102.

A slot 103 is provided in the first axial frame member 88 for each stop device 98, the slot being positioned between the lugs 71 and allowing the first sector 101 to pass through the frame member 88 into the grate reception zone 55 as shown in FIG. 10.

It should be understood from FIGS. 9 and 10 that the position of the cams 70 determines which sector contacts the frame member 72 and effectively determine the lower limit of the concave adjustment range.

Figure 12:
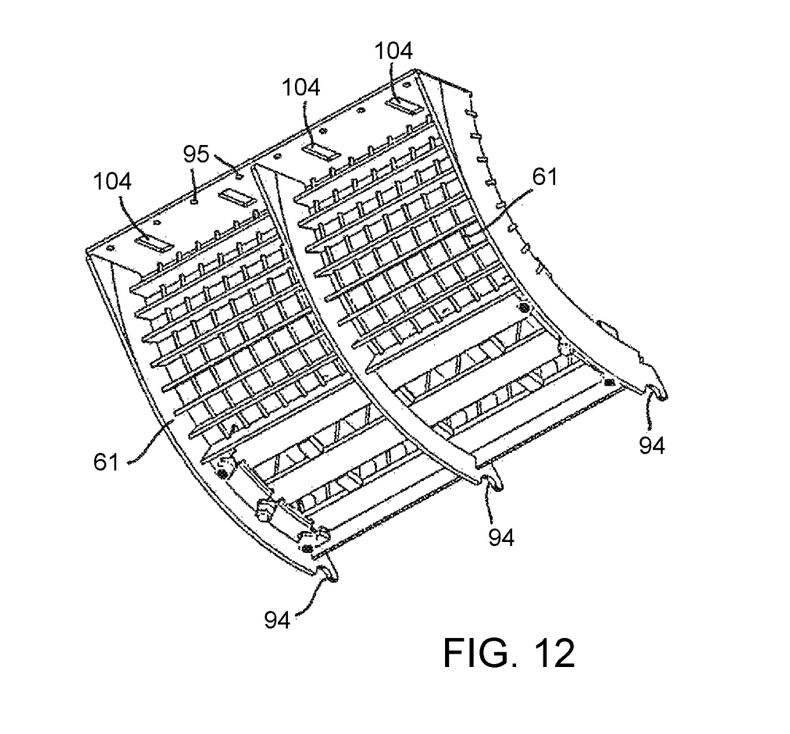

As can be seen in FIG. 12, the small grain concave segments 61 are provided with corresponding slots 104 which align with the slots 103 when installed in the concave frame 52. Shown in FIG. 10, installation of the small grain concave segments 61 does not, therefore, interfere with the cam and allows the first sector 101 of each cam 70 to remain at least partly inside the grate reception zone 55. As a result, the second sector 102 is positioned so as to contact the frame member 72 when the small grain concave 61 is installed.

On the other hand, the corn concave grate segments 81 are not provided with corresponding slots. Therefore, when installed, the corn concave segments force the cams 70 outside of the grate reception zone 55, effectively rotating the cams 70 so that the first sector 101 is positioned so as to contact the frame member 72 and effectively change the lower limit of the concave adjustment range. This is shown in FIG. 9.

It should be appreciated that the cams 70 may differ in shape from those illustrated which still remaining within the scope of the invention. Furthermore, it should be understood that the cams 70 may contact other forms of stop member which are fixed in position with respect to the main frame 17 and/or the rotor housing 24.

In summary there is provided threshing apparatus in a combine harvester with a main frame and a threshing rotor supported by the main frame. A concave frame is provided to support one or more interchangeable arcuate concave grate segments in a grate reception zone. An adjustment mechanism is provided to permit adjustment of a clearance between the concave grate segments and the rotor. A multi-position stop device is provided to determine the lower limit of a concave adjustment range. The position of the stop device is determined by a profile of an installed concave grate segment.

The foregoing has broadly outlined some of the more pertinent aspects and features of the present invention. These should be construed to be merely illustrative of some of the more prominent features and applications of the invention. Other beneficial results can be obtained by applying the disclosed information in a different manner or by modifying the disclosed embodiments. Accordingly, other aspects and a more comprehensive understanding of the invention may be obtained by referring to the detailed description of the exemplary embodiments taken in conjunction with the accompanying drawings.

The invention claimed is:

1. A threshing apparatus in a combine harvester, the threshing apparatus comprising:
a main frame;
a frame member mounted to the main frame;
a threshing rotor supported by the main frame and being operable to rotate and define a substantially cylindrical swept envelope when in rotation;
a concave frame adapted to support one or more arcuate concave grate segments in a grate reception zone defined by the concave frame, the concave frame being mounted to the main frame so as to enable adjustment of a radial clearance with respect to the swept envelope;
an adjustment linkage coupled to the concave frame for adjusting said radial clearance within an adjustment range; and
a stop device secured to the concave frame,
wherein the stop device comprises a multi-position stop element that is shiftable between a plurality of alternative positions, the stop device configured to interact with the frame member so as to determine a lower limit of the adjustment range, and when in one of said alternative positions a portion of the stop element resides inside the grate reception zone.

2. The threshing apparatus according to claim 1, wherein the concave frame surrounds an outside edge of the grate reception zone and comprises first and second axial frame members which extend generally parallel to the rotation axis of the threshing rotor, and a pair of generally arcuate, axially-spaced, members which connect the first and the second members.

3. The threshing apparatus according to claim 2, wherein the stop device is secured to the first axial frame member of the concave frame.

4. The threshing apparatus according to claim 2, wherein the second axial frame member comprises a rounded cross-section which provides an attachment ledge for engaging said one or more arcuate concave grate segments.

5. The threshing apparatus according to claim 1, wherein the concave frame is pivotally mounted to the main frame about a pivot axis that is generally parallel to the rotation axis of the threshing rotor.

6. The threshing apparatus according to claim 5, wherein the adjustment linkage is pivotally coupled to the concave frame at a position spaced from the pivot axis, and wherein the adjustment linkage is operable to pivot the concave frame around the pivot axis to adjust the radial clearance.

7. The threshing apparatus according to claim 1, further comprising a grate segment secured to the concave frame in the grate reception zone, wherein the grate segment forces the stop element outside of the grate reception zone.

8. The threshing apparatus according to claim 1, further comprising a grate segment secured to the concave frame in the grate reception zone, wherein the grate segment has a profile that permits the stop element to reside inside the grate reception zone.

9. The threshing apparatus according to claim 8, wherein the grate segment comprises a slot or recess for receiving the stop element.

10. A combine harvester comprising the threshing apparatus according to claim 1.

11. A threshing apparatus in a combine harvester, the threshing apparatus comprising:
a main frame;
a threshing rotor supported by the main frame and being operable to rotate and define a substantially cylindrical swept envelope when in rotation;
a concave frame adapted to support one or more arcuate concave prate segments in a grate reception zone defined by the concave frame, the concave frame being mounted to the main frame so as to enable adjustment of a radial clearance with respect to the swept envelope;
an adjustment linkage coupled to the concave frame for adjusting said radial clearance within an adjustment range; and
a stop device secured to the concave frame,
wherein the stop device comprises a multi-position stop element that is shiftable between a plurality of alternative positions that determine a lower limit of the adjustment range, and when in one of said alternative positions a portion of the stop element resides inside the grate reception zone;
wherein the stop element comprises a cam rotatably supported on first axial frame member, wherein the cam passes through a slot provided in the first axial frame member into the grate reception zone when in said one of said alternative positions.

12. The threshing apparatus according to claim 11, wherein the stop device further comprises a pair of lugs secured to the first axial frame member and located either side of the slot, wherein the cam is rotatably supported between the lugs.

13. The threshing apparatus according to claim 11, wherein the cam comprises a first and a second sector wherein the first sector has a radial dimension that is greater than that of the second sector, wherein the said plurality of alternative positions includes a first position in which the first sector resides inside the grate reception zone, and a second position in which the first sector resides completely outside of the grate reception zone, and wherein the cam permits a smaller radial clearance when in the first position than when in the second position.

14. The threshing apparatus according to claim 11, wherein the concave frame surrounds an outside edge of the grate reception zone and comprises first and second axial frame members which extend generally parallel to the rotation axis of the threshing rotor, and a pair of generally arcuate, axially-spaced, members which connect the first and the second members, and wherein the stop device is secured to the first axial frame member of the concave frame.

15. A threshing system in a combine harvester, the threshing system comprising:

a main frame;

a threshing rotor supported by the main frame and being operable to rotate and define a substantially cylindrical swept envelope when in rotation;

a concave frame adapted to support at least one arcuate concave grate segment in a grate reception zone defined by the concave frame, the concave frame being mounted to the main frame so as to enable adjustment of a radial clearance with respect to the swept envelope;

an adjustment linkage coupled to the concave frame for adjusting said radial clearance within an adjustment range; and a stop device secured to the concave frame, wherein the stop device comprises a multi-position stop element that is shiftable between a plurality of alternative positions that determine a lower limit of the adjustment range, and when in one of said alternative positions, a portion of the stop element resides inside the grate reception zone;

first and second alternative arcuate grate segments for mounting to the concave frame such that during operation of the threshing system, the concave frame operates with either the first grate segment or the second grate segment mounted in the concave frame, wherein the first grate segment has a greater radius of curvature than the second grate segment, and wherein the first grate segment forces the stop element outside of the grate reception zone when the first grate segment is fitted in the concave frame, and wherein the second grate segment has a profile that permits the stop element to reside inside the grate reception zone when in one of said alternative positions when the second grate segment is fitted in the concave frame.

16. The threshing system of claim 15 wherein the stop element comprises a cam rotatably supported on the concave frame.

17. The threshing system of claim 16 wherein the cam passes through a slot provided in the concave frame member into the grate reception zone when in said one of said alternative positions and the second grate segment is fitted in the concave frame.

18. The threshing system according to claim 17, wherein the cam comprises a first sector and a second sector, wherein the first sector has a radial dimension that is greater than that of the second sector, wherein the said plurality of alternative positions includes a first position in which the first sector resides inside the grate reception zone, and a second position in which the first sector resides completely outside of the grate reception zone, and wherein the cam permits a smaller radial clearance when in the first position than when in the second position.

19. The threshing system according to claim 15, wherein the concave frame surrounds an outside edge of the grate reception zone and comprises first and second axial frame members which extend generally parallel to the rotation axis of the threshing rotor, and a pair of generally arcuate, axially-spaced, members which connect the first and the second members.

20. The threshing system according to claim 15, wherein the adjustment linkage is pivotally coupled to the concave frame at a position spaced from the pivot axis, and wherein the adjustment linkage is operable to pivot the concave frame around the pivot axis to adjust the radial clearance.

* * * * *